United States Patent
Ravi et al.

(10) Patent No.: US 9,137,276 B2
(45) Date of Patent: Sep. 15, 2015

(54) MANAGING MESSAGE DISTRIBUTION IN A NETWORKED ENVIRONMENT

(71) Applicant: International Business Machines Corporation, Armonk, NY (US)

(72) Inventors: Lohith Ravi, Bangalore (IN); Lohitashwa Thyagaraj, Bangalore (IN); Venugopala K Vemula, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 14/012,322

(22) Filed: Aug. 28, 2013

(65) Prior Publication Data
US 2015/0067071 A1     Mar. 5, 2015

(51) Int. Cl.
*H04L 29/06* (2006.01)
*H04L 12/58* (2006.01)

(52) U.S. Cl.
CPC .............. *H04L 65/403* (2013.01); *H04L 51/12* (2013.01)

(58) Field of Classification Search
CPC .................................................. G06Q 10/107
USPC ......................................................... 709/206
See application file for complete search history.

(56) References Cited

U.S. PATENT DOCUMENTS

| 2002/0029261 | A1 | 3/2002 | Shibata |
| 2007/0043824 | A1 | 2/2007 | Fremantle |
| 2008/0059597 | A1* | 3/2008 | Blevins et al. ................ 709/207 |
| 2008/0235709 | A1 | 9/2008 | Roberts |
| 2013/0304826 | A1* | 11/2013 | Li et al. ......................... 709/206 |

OTHER PUBLICATIONS

"Configuration for workload sharing or scalability", http://pic.dhe.ibm.com/infocenter/wasinfo/v7r0/index.jsp?topic=%2Fcom.ibm.websphere.nd.multiplatform.doc%2Finfo%Fae%2Fae%2Fwelcome_ndmp.html, last updated Aug. 8, 2013.
Kreps, et al., "Kafka: a Distributed Messaging System for Log Processing", Jun. 12, 2011.

* cited by examiner

*Primary Examiner* — Vivek Srivastava
*Assistant Examiner* — Sibte Bukhari
(74) *Attorney, Agent, or Firm* — Maeve McCarthy (57) ABSTRACT

A method for managing message distribution in a networked computing environment. The method includes determining, for a particular topic, at least a first subscriber messaging engine and a second subscriber messaging engine to receive a topic message. The method includes determining that the first subscriber messaging engine is to act as a cache for the second subscriber messaging engine. The method includes sending the topic message to the first subscriber messaging engine. The method then includes sending a reference message to the second subscriber messaging engine, the reference message being able to be used to retrieve the topic message from the first subscriber messaging engine.

10 Claims, 5 Drawing Sheets

MANAGING MESSAGE DISTRIBUTION IN A NETWORKED ENVIRONMENT

FIELD OF THE INVENTION

The present invention relates generally to the field of multicomputer data transferring and communication, and more particularly to managing message distribution in a networked computing environment.

BACKGROUND OF THE INVENTION

Publish/subscribe (pub-sub) data processing and messaging systems have become very popular in recent years as a way of distributing data messages. Pub-sub messaging systems are a messaging technology that may be used in Internet based or other networked environments. In a pub-sub network, one or many publisher applications send messages to the network and subscriber applications register subscriptions to indicate their interest in receiving certain types of messages pertaining to certain topics. If a published message matches one of the subscriptions stored for a particular subscriber, the message is passed to the subscriber. In typical pub-sub messaging systems, it is the responsibility of a messaging engine where the publisher application is connected to push messages to messaging engines connected to relevant, or subscribed, subscriber applications. It is common, especially in cloud computing scenarios, to have a messaging system with hundreds, or more, messaging engines.

SUMMARY

Embodiments of the present invention disclose a method, computer program product, and computer system for managing message distribution in a networked computing environment. The method includes determining, by one or more computer processors, for a particular topic, at least a first subscriber messaging engine and a second subscriber messaging engine to receive a topic message. The method includes determining, by the one or more computer processors, the first subscriber messaging engine is to act as a cache for the second subscriber messaging engine. The method includes sending, by the one or more computer processors, the topic message to the first subscriber messaging engine. The method then includes sending, by the one or more computer processors, a reference message to the second subscriber messaging engine, the reference message able to be used to retrieve the topic message from the first subscriber messaging engine.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Figure 1:
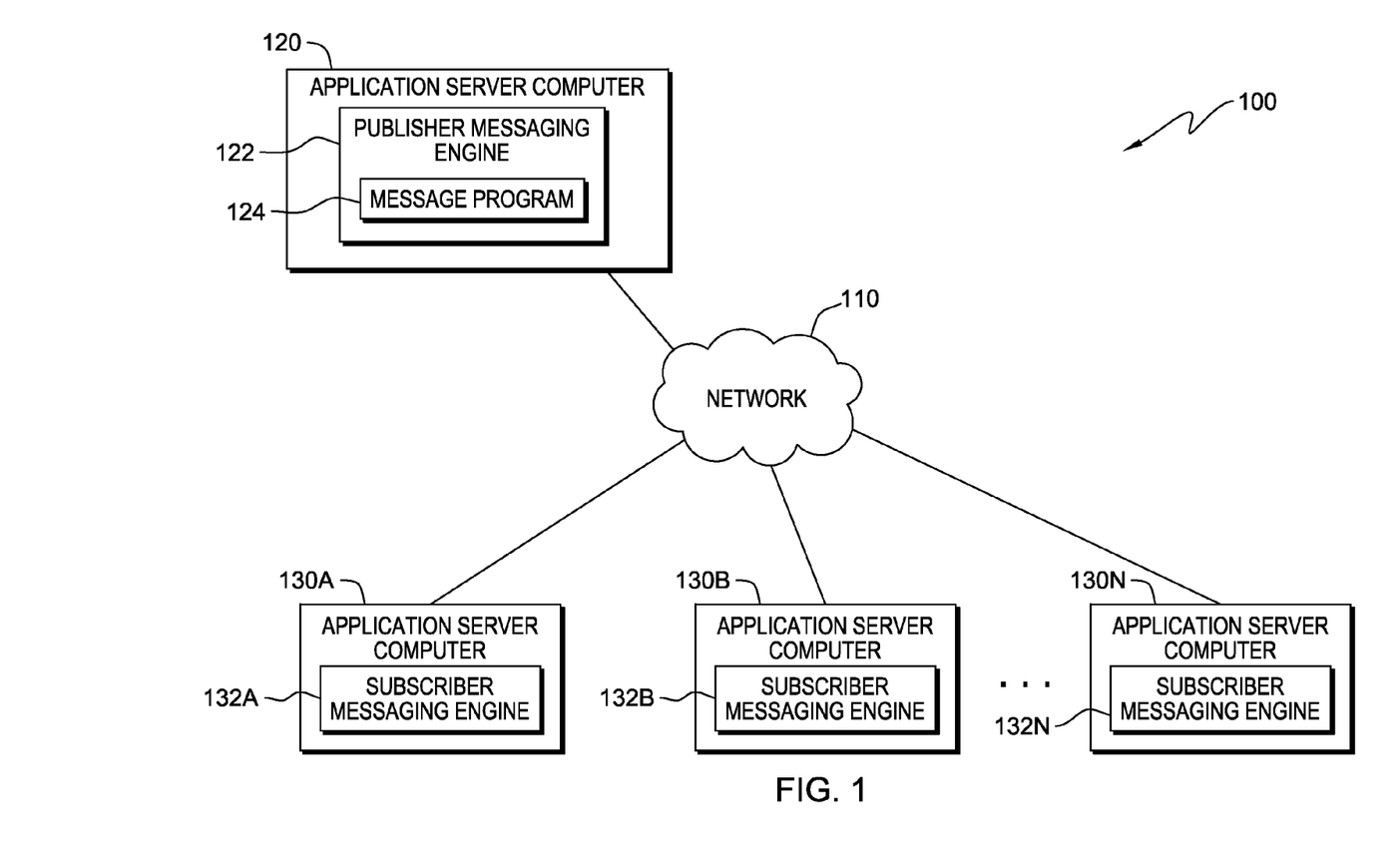
FIG. 1 is a functional block diagram illustrating a messaging distribution environment, in accordance with an embodiment of the present invention.

The present invention will now be described in detail with reference to the Figures. FIG. 1 is a functional block diagram illustrating a message distribution environment, generally designated 100, in accordance with one embodiment of the present invention.

Message distribution environment 100 includes application server computer 120 and application server computers 130A to 130N, all interconnected via network 110. Message distribution environment 100 is representative of a messaging system, including any number of messaging clients, both messaging engines with publisher applications and messaging engines with subscriber applications. In various other embodiments of the present invention, messaging clients within message distribution environment 100 are connected via network 110 in a network architecture such as a bus network topology, a mesh networking topology or a tree structure topology. Network 110 can be, for example, a local area network (LAN), a wide area network (WAN) such as the Internet, or any combination of the two, and can include wired, wireless, or fiber optic connections. In general, network 110 can be any combination of connections and protocols that will support communication and exchange of messages between application server computer 120 and application server computers 130A to 130N, including distributed computing such as cloud computing.

Application server computer 120 includes publisher messaging engine 122 and message program 124. In various embodiments of the present invention, application server computer 120 can be a laptop computer, a tablet computer, a netbook computer, a personal computer (PC), a personal digital assistant (PDA), a smart phone, or any programmable electronic device capable of communicating with application server computers 130A to 130N via network 110. Application server computer 120 may represent a computing system utilizing clustered computers and components to act as a single pool of seamless resources when accessed through a network. This is a common implementation for data centers and for cloud computing applications. Application server computer 120 may include internal and external hardware components, as depicted and described in further detail with respect to FIG. 4.

Publisher messaging engine 122 is a server component capable of providing messaging functions of a service integration bus, for example, enabling the bus to send and receive messages. Publisher messaging engine 122 manages the bus resources and allows applications to communicate with the bus. A publisher messaging engine, such as publisher messaging engine 122, includes an application for publishing, or pushing, topic messages to subscriber messaging engines, such as subscriber messaging engines 132A to 132N in message distribution environment 100. Subscriber messaging engines are connected to subscribers for a particular topic and include an application to receive topic messages published from a publisher messaging engine. Topic messages are messages pertaining to a particular topic to which a number of subscribers have subscribed to receive messages, and which a publisher messaging engine sends, or pushes messages within a messaging system. Topic messages can also include message lists, or message groups, containing multiple messages.

Message program 124 determines which of subscriber messaging engines 132A to 132N may act as cache messaging engines for message distribution. Message program 124 sends topic messages to each cache messaging engine. Each determined cache messaging engine is associated, for a particular topic, with a subset of subscriber messaging engines. Message program 124 sends a reference message to the subset of subscriber messaging engines, e.g., the messaging engines that are not acting as cache messaging engines. The reference message is linked with the topic message, and provides the subscriber messaging engines with access to pull the topic message from an associated cache subscriber messaging engine. In various embodiments of the present invention, the reference message can be an identifier representing the topic message, or other identifying information, for example, a unique number, and the subscriber messaging engines may provide the reference message or unique number to the associated cache subscriber messaging engine. The associated cache subscriber messaging engine can then locate a topic message pertaining to the unique number.

Application server computers 130A to 130N include subscriber messaging engines 132A to 132N. In various embodiments of the present invention, application server computers 130A to 130N can be laptop computers, tablet computers, netbook computers, PCs, PDAs, smart phones, or any programmable electronic device capable of communicating with application server computer 120 via network 110. Application server computers 130A to 130N may represent a computing system utilizing clustered computers and components to act as a single pool of seamless resources when accessed through a network.

Subscriber messaging engine 132 is a server component capable of providing messaging functions of a service integration bus, for example, enabling the bus to send and receive messages. Subscriber messaging engine 132 receives topic messages from publisher messaging engine 122 via network 110. In various embodiments of the present invention, each of subscriber messaging engines 132 can act as a cache subscriber messaging engine for an associated subset of subscriber messaging engines. Message program 124 determines which subscriber messaging engines may act as cache messaging engines, based on the topology and the number of publisher messaging engines and subscriber messaging engines for a topic within message distribution environment 100. Message program 124 can dynamically restructure the determined cache subscriber messaging engines, for example, if a determined cache subscriber messaging engine crashes, if a subscriber messaging engine is added to the environment, if additional subscribers connect to a subscriber messaging engine, or a number of messaging clients, including publisher and subscriber messaging engines, are added or deleted from message distribution environment 100. In various embodiments, an administrator of a messaging system, such as message distribution environment 100, can determine a threshold value of messaging clients, either additions or deletions, which can trigger dynamic restructuring of determined cache subscriber messaging engines. A determined subset of subscriber messaging engines receive a reference message from publisher messaging engine 122, and can use the reference message to pull the topic message from associated cache subscriber messaging engines.

Figure 2:
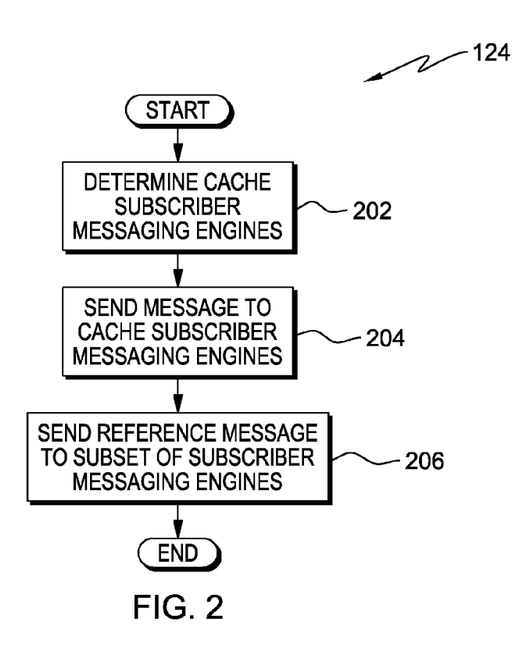
FIG. 2 is a flowchart depicting operational steps of a message program for determining messaging engines to act as caches and distributing messages within the messaging distribution environment of FIG. 1, in accordance with an embodiment of the present invention.

FIG. 2 is a flowchart depicting operational steps of message program 124 for determining messaging engines to act as caches and distributing messages within messaging distribution environment 100, in accordance with an embodiment of the present invention.

Message program 124 determines cache subscriber messaging engines (step 202). Based on the number of subscribers connected to each subscriber messaging engine for a particular topic message, message program 124 determines cache subscriber messaging engines for other, associated subscriber messaging engines. Message program 124 lists each subscriber messaging engine for a topic, and provides each subscriber messaging engine with tokens. Each token represents a subscriber to the particular topic message on each subscriber messaging engine 132A to 132N. Based on the number of tokens, or subscribers connected on each subscriber messaging engine, message program 124 sends a request to each subscriber messaging engine to be a cache subscriber messaging engine for an associated subset of subscriber messaging engines.

Message program 124 receives and stores responses from each subscriber messaging engine, which can include identification information for the subscriber messaging engine and a number of tokens, or subscribers connected on each subscriber messaging engine. Each subscriber messaging engine can send multiple tokens which contribute to indicating an availability to be a cache. Message program 124 selects one, or a set of, subscriber messaging engines as caches for the particular topic. For example, for a particular topic message, if subscriber messaging engine 132A returns 20 tokens, subscriber messaging engine 132B returns 15 tokens, and subscriber messaging engine 132C returns two tokens, subscriber messaging engine 132B can be selected as the cache subscriber messaging engine for subscriber messaging engine 132A, because the number of subscribers is high when compared to subscriber messaging engine 132C. Message program 124 determines cache subscriber messaging engines, which is described in further detail with reference to FIG. 3. In an exemplary embodiment of the present invention, a set of cache subscriber messaging engines is equal in number to a number of message distribution cycles, such that in each cycle of message distribution, a topic message is sent to each determined cache subscriber messaging engine. For example, in a message distribution system with subscribers for three particular topics, there will be three cycles of message distribution, with a topic message sent to each determined cache subscriber messaging engine in each cycle.

Message program 124 sends a topic message to cache subscriber messaging engines (step 204). In an illustrative example, subscriber messaging engine 132A is determined as a cache messaging engine for subscriber messaging engines 132B, 132C and 132D. Message program 124, included within publisher messaging engine 122, instructs publisher messaging engine 122 to send a topic message, or message list, to subscriber messaging engine 132A.

Message program 124 sends a reference message to a subset of subscriber messaging engines (step 206). In the illustrative example above, the associated subset of subscriber messaging engines for subscriber messaging engine 132A includes subscriber messaging engines 132B, 132C, and 132D. Message program 124 sends the reference message to subscriber messaging engines 132B, 132C, and 132D. When a subscriber connects to subscriber messaging engine 132B, a request is sent to associated cache messaging engine 132A to retrieve the topic message based on the reference message received by subscriber messaging engine 132B.

Figure 3:
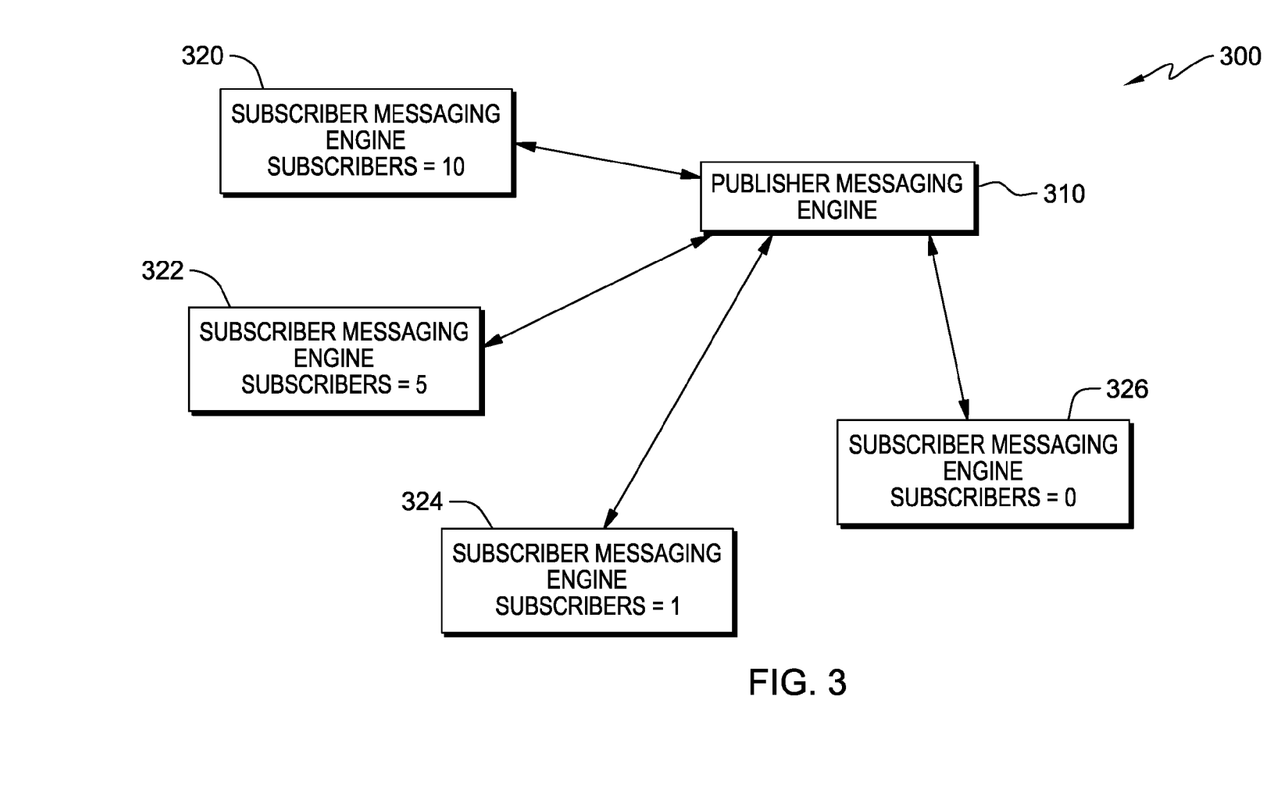
FIG. 3 illustrates an exemplary depiction of a message distribution system, in which the message program of FIG. 2 determines cache subscriber messaging engines, in accordance with an embodiment of the present invention.

FIG. 3 illustrates an exemplary depiction of a message distribution system 300, in which message program 124 determines cache subscriber messaging engines, in accordance with an embodiment of the present invention.

For a particular topic in messaging distribution environment 100, represented by message distribution system 300, message program 124 on publisher messaging engine 310 determines cache subscriber messaging engines based on how many subscribers are present for the particular topic. For example, in illustrated message distribution system 300 there are four subscriber messaging engines for the particular topic, each with varying numbers of subscribers. Subscriber messaging engine 320 has ten subscribers, subscriber messaging engine 322 has five subscribers, subscriber messaging engine 324 has only one, and subscriber messaging engine 326 has zero subscribers for the particular topic.

Message program 124 provides each subscriber messaging engine with a token for each subscriber to the particular topic. Each subscriber messaging engine sends the tokens back, and based on the number of tokens received from each subscriber messaging engine, a cache subscriber messaging engine is determined for the particular topic. For example, in the illustrated message distribution system 300, message program 124 can select subscriber messaging engine 322 as the cache for subscriber messaging engine 320 because the number of subscribers on subscriber messaging engine 322 is high as compared to the number on subscriber messaging engines 324 and 326. Selecting a subscriber messaging as a cache when it does not have a lot of subscribers for the particular topic may lead to decreased performance and high latency when retrieving topic messages.

Figure 4:
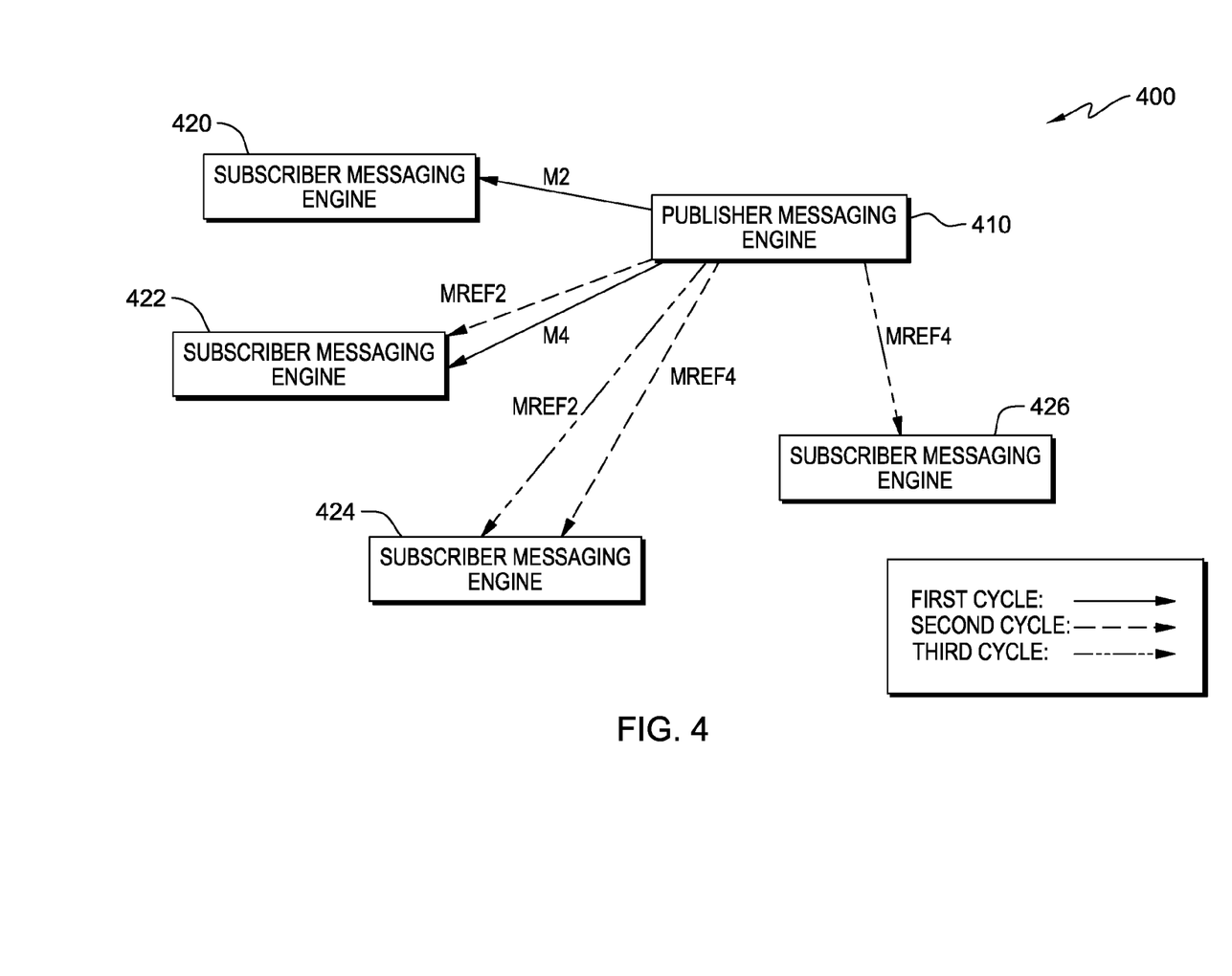
FIG. 4 illustrates an exemplary flow diagram of a distribution cycle for message distribution based on operation of the message program in the messaging distribution environment of FIG. 1, in accordance with an embodiment of the present invention.

FIG. 4 illustrates an exemplary flow diagram of a distribution cycle for message distribution based on the operation of message program 124 in messaging distribution environment 100, in accordance with an embodiment of the present invention. In various embodiments of the present invention, cache subscriber messaging engines can be determined for various distribution cycles, such as, for example, a round robin type message distribution, as opposed to a one to one message distribution. As described above with reference to FIGS. 2 and 3, message program 124 determines a cache subscriber messaging engine for each topic within a messaging system, for example, messaging system 400 in FIG. 4. For example, as illustrated in FIG. 4, for particular topic message M2, message program 124 determines subscriber messaging engine 420 as the cache for subscriber messaging engine 422 and subscriber messaging engine 424. Additionally, for particular topic message M4, subscriber messaging engine 422 acts as the cache for subscriber messaging engine 424 and subscriber messaging engine 426.

Messaging system 400 illustrates a round robin type message distribution for topic message M2, for example, topic "BASEBALL", and topic message M4, for example, topic "TENNIS." In a first cycle, or round, of message distribution, publisher messaging engine 410 sends topic message M2 to a determined cache subscriber messaging engine 420, and sends topic message M4 to determined cache subscriber messaging engine 422. In a second cycle, or round, of message distribution, publisher messaging engine 410 sends reference message MREF2, the reference message for topic message M2, to one of an associated subset of subscriber messaging engines, for example, subscriber messaging engine 422. In the same cycle, publisher messaging engine 410 sends reference message MREF4, the reference message for topic message M4, to one of a subset of subscriber messaging engines, for example, subscriber messaging engine 424. Similarly, in a third cycle, or round, of message distribution, MREF2 is sent to subscriber messaging engine 424 and MREF4 is sent to subscriber messaging engine 426.

When a subscriber connects to subscriber messaging engine 424, a request is sent to an associated cache subscriber messaging engine in order to retrieve the topic message. For example, a subscriber to topic "BASEBALL", when connecting to subscriber messaging engine 424, pulls topic message M2 from cache subscriber messaging engine 420, while a subscriber to topic "TENNIS" pulls topic message M4 from cache subscriber messaging engine 422.

Figure 5:
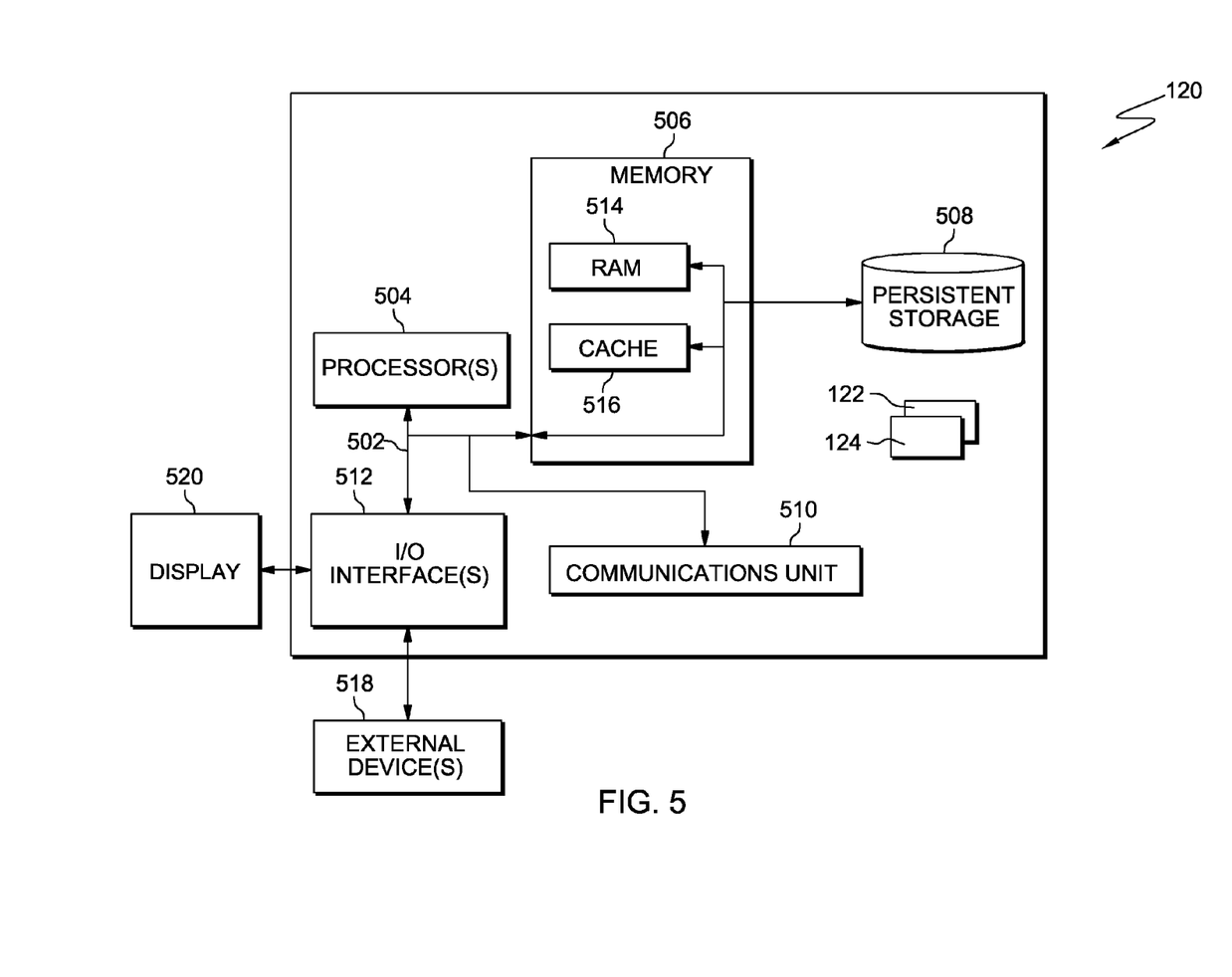
FIG. 5 depicts a block diagram of internal and external components of the application server computer executing the message program, in accordance with an embodiment of the present invention.

FIG. 5 depicts a block diagram of components of application server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Application server computer 120 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Publisher messaging engine 122 and message program 124 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including application server computers 130A to 130N. In these examples, communications unit 510 includes one or more network interface cards. Communications unit 510 may provide communications through the use of either or both physical and wireless communications links. Publisher messaging engine 122 and message program 124 may be downloaded to persistent storage 508 through communications unit 510.

I/O interface(s) 512 allows for input and output of data with other devices that may be connected to application server computer 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., publisher messaging engine 122 and message program 124, can be stored on such portable computer-readable storage media and can be loaded onto persistent storage 508 via I/O interface(s) 512. I/O interface(s) 512 also connect to a display 520. Display 520 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for managing message distribution in a networked computing environment, the computer program product comprising:
one or more computer-readable tangible storage devices and program instructions stored on the one or more computer-readable tangible storage devices, wherein the one or more computer-readable tangible storage devices are hardware, the hardware including at least a memory, the program instructions comprising:
program instructions to determine, for a particular topic, at least a first subscriber messaging engine and a second subscriber messaging engine to receive a topic message from a publisher messaging engine, wherein the topic message is a message pertaining to a particular topic to which at least the first subscriber messaging engine and the second subscriber messaging engine have subscribed;
program instructions to determine the first subscriber messaging engine is to act as a cache for the second subscriber messaging engine;
wherein the program instructions to determine the first subscriber messaging engine is to act as a cache for the second subscriber messaging engine further comprise:
program instructions to determine a number of subscribers for the particular topic connected to each of the first subscriber messaging engine and the second subscriber messaging engine;
program instructions to compare the number of subscribers connected to the first subscriber messaging engine to the number of subscribers connected to the second subscriber messaging engine; and
program instructions to determine the number of subscribers connected to the first subscriber messaging engine is higher than the number of subscribers connected to the second subscriber messaging engine;
program instructions to send the topic message to the first subscriber messaging engine; and
program instructions to send a reference message to the second subscriber messaging engine, the reference message being able to be used to retrieve the topic message from the first subscriber messaging engine, and wherein the reference message is linked with the topic message.

2. The computer program product of claim 1, wherein the program instructions to determine a number of subscribers for the particular topic connected to each of the first subscriber messaging engine and the second subscriber messaging engine further comprise program instructions to receive a token from each of the subscriber messaging engines, the token representing the number of subscribers.

3. The computer program product of claim 1, wherein the reference message includes information identifying the topic message, and the identifying information is used to locate the topic message stored in the first subscriber messaging engine.

4. The computer program product of claim 1, further comprising program instructions to send, for the particular topic, the reference message to at least one other subscriber messaging engine.

5. The computer program product of claim 1, further comprising:
program instructions to determine, for the particular topic, one or more topic messages to be distributed to one or more subscriber messaging engines;
program instructions to determine a cache subscriber messaging engine for each of the one or more subscriber messaging engines; and
program instructions to distribute the one or more topic messages in a distribution cycle such that in a first cycle, each of the one or more topic messages is sent to the determined cache subscriber messaging engine, and in a second cycle, a reference message for each of the one or more topic messages is sent to a subscriber messaging engine.

6. A computer system for managing message distribution in a networked computing environment, the computer system comprising:
one or more computer processors;
one or more computer-readable tangible storage media;
program instructions stored on the one or more computer-readable tangible storage media for execution by at least one of the one or more computer processors, the program instructions comprising:
program instructions to determine, for a particular topic, at least a first subscriber messaging engine and a second subscriber messaging engine to receive a topic message from a publisher messaging engine, wherein the topic message is a message pertaining to a particular topic to which at least the first subscriber messaging engine and the second subscriber messaging engine have subscribed;
program instructions to determine the first subscriber messaging engine is to act as a cache for the second subscriber messaging engine;
wherein the program instructions to determine the first subscriber messaging engine is to act as a cache for the second subscriber messaging engine further comprise:
program instructions to determine a number of subscribers for the particular topic connected to each of the first subscriber messaging engine and the second subscriber messaging engine;
program instructions to compare the number of subscribers connected to the first subscriber messaging engine and the number of subscribers connected to the second subscriber messaging engine; and
program instructions to determine the number of subscribers connected to the first subscriber messaging engine is higher than the number of subscribers connected to the second subscriber messaging engine;
program instructions to send the topic message to the first subscriber messaging engine; and
program instructions to send a reference message to the second subscriber messaging engine, the reference message being able to be used to retrieve the topic message from the first subscriber messaging engine, and wherein the reference message is linked with the topic message.

7. The computer system of claim 6, wherein the program instructions to determine a number of subscribers for the particular topic connected to each of the first subscriber messaging engine and the second subscriber messaging engine further comprise program instructions to receive a token from each of the subscriber messaging engines, the token representing the number of subscribers.

8. The computer system of claim 6, wherein the reference message includes information identifying the topic message, and the identifying information is used to locate the topic message stored in the first subscriber messaging engine.

9. The computer system of claim 6, further comprising program instructions to send, for the particular topic, the reference message to at least one other subscriber messaging engine.

10. The computer system of claim 6, further comprising:
- program instructions to determine, for the particular topic, one or more topic messages to be distributed to one or more subscriber messaging engines;
- program instructions to determine a cache subscriber messaging engine for each of the one or more subscriber messaging engines; and
- program instructions to distribute the one or more topic messages in a distribution cycle such that in a first cycle, each of the one or more topic messages is sent to the determined cache subscriber messaging engine, and in a second cycle, a reference message for each of the one or more topic messages is sent to a subscriber messaging engine.

\* \* \* \* \*